A. A. COBB.
LAMP ATTACHMENT.
APPLICATION FILED JULY 14, 1920.

1,418,128.                                   Patented May 30, 1922.

Inventor
Augustus A. Cobb,
By G. Hume Talbert
Attorney

UNITED STATES PATENT OFFICE.

AUGUSTUS A. COBB, OF MARION, MASSACHUSETTS.

LAMP ATTACHMENT.

1,418,128. Specification of Letters Patent. Patented May 30, 1922.

Application filed July 14, 1920. Serial No. 396,099.

*To all whom it may concern:*

Be it known that I, AUGUSTUS A. COBB, a citizen of the United States of America, residing at Marion, in the county of Plymouth and State of Massachusetts, have invented new and useful Improvements in Lamp Attachments, of which the following is a specification.

The object of the invention is to provide a lamp or headlight attachment for automobiles and similar motor-driven vehicles as a means of restricting the zone or shaft of light projected by the vehicle lamp and concentrating the rays in such a manner as to afford the required view of the road in advance of the vehicle to the driver thereof without serving as a means of blinding or otherwise interfering with the operations of the driver of an approaching car or a car traversing the same road in the opposite direction, and in this connection to provide an attachment which may be generally classified as a dimmer for headlights which will comply in its functions with the requirements and regulations prescribed and adapted by municipal county and State authorities for the guidance of the drivers of automobiles; and with these objects in view the invention consists in the construction and combination of parts of which a preferred embodiment is shown in the drawing wherein:

Figure 1:
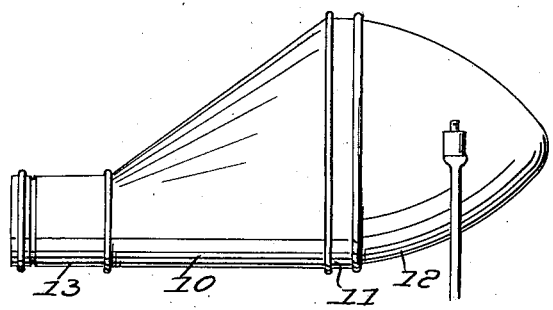
Figure 1 is a side view of the attachment applied in the operative position to an automobile lamp or headlight.
Figure 2:
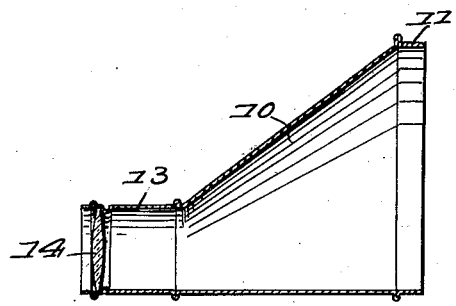
Figure 2 is a longitudinal sectional view of the same.
Figure 3:
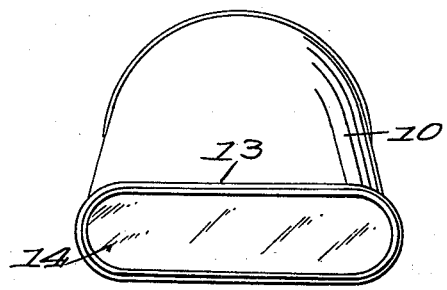
Figure 3 is a front view thereof.

The device consists essentially of a forwardly reduced or contracted shell 10 provided at its rear end with a collar 11 of a shape and size adapted to be fitted upon the casing 12 of an automobile lamp or headlight, it being preferable to so construct the collar as to adapt it to be removably fitted upon the lamp casing so that it may be applied or detached as required, to the end that it may be used when necessary and may be omitted when it is preferred to use the lamps or headlights in the ordinary way or without restriction of the rays of light projecting therefrom.

In the illustrated embodiment of the invention the shell is inclined downwardly and forwardly at its upper side, or with relation to its upper wall without substantial modification of the position of the wall which may be projected forward substantially in the horizontal plane of the lower side of the attaching collar 11, and at its forward end the shell is provided with a transversely elongated but vertical reduced nozzle or outlet sleeve 13 in which is fitted the lens 14. The forwardly and downwardly inclined upper wall of the shell serves to intercept the rays of light projected horizontally from the center of the headlight or lamp 12 and also the rays which are projected through that portion of the front of the headlight casing which is above the horizontal plane of the center, the said rays from the upper portion of the lamp being diverted by the inner surface of the inclined upper wall of the shell and caused by reflection to intersect and mingle with the rays which are projected from the lower portion of the lamp or the portion thereof below a horizonal plane extending through the center of the lamp, with the result that the light rays permitted to escape through the transversely elongated outlet sleeve of the dimmer attachment are projected in a plane below that occupied by the eyes of the drivers of approaching vehicles and yet serve to illuminate the road surface in advance of the vehicle provided with the attchment. Consequently whereas the blinding effect upon the eyes of the drivers of approaching vehicles is avoided, the path of the car equipped with the attachment is lighted sufficiently to serve as a guide for the drivers of both cars.

Having described the invention, I claim:

A headlight dimmer attachment having a shell provided with means for attachment to the casing of an automobile headlight, and an outlet sleeve disposed at the forward end of the shell with its lower wall in the plane of the lower wall of the shell, the outlet sleeve being transversely elongated and the top wall of the shell being inclined downwardly and forwardly and merging with the upper wall of the sleeve.

In testimony whereof he affixes his signature.

AUGUSTUS A. COBB.